United States Patent [19]

James et al.

[11] Patent Number: 5,495,592
[45] Date of Patent: Feb. 27, 1996

[54] SYSTEM FOR FINDING AND SETTING ADDRESS PORTION OF VARIABLE-LENGTH CHARACTER STRING BY XOR-ING PORTION IN NUMBER OF BYTES WITHIN SINGLE INSTRUCTION

[75] Inventors: David V. James, Palo Alto; Mario D. Nemirovsky, San Jose, both of Calif.

[73] Assignee: Apple Computer, Inc., Cupertino, Calif.

[21] Appl. No.: 369,852

[22] Filed: Jan. 6, 1995

Related U.S. Application Data

[63] Continuation of Ser. No. 77,528, Jun. 14, 1993, abandoned.
[51] Int. Cl.[6] .................................................. G06F 12/04
[52] U.S. Cl. ................. 395/421.02; 395/846; 364/252.6
[58] Field of Search ................................ 395/421.02, 846

[56] References Cited

U.S. PATENT DOCUMENTS

| | | | |
|---|---|---|---|
| 4,219,874 | 8/1980 | Gusev et al. | 395/775 |
| 4,520,439 | 5/1985 | Liepa | 395/411 |
| 4,569,016 | 2/1986 | Hao et al. | . |
| 4,654,781 | 3/1987 | Schwartz et al. | 395/421.09 |
| 4,739,471 | 4/1988 | Baum et al. | . |
| 4,873,627 | 10/1989 | Baum et al. | . |
| 4,916,655 | 4/1990 | Ohsone et al. | 395/600 |
| 5,041,968 | 8/1991 | Yamaguchi | . |
| 5,060,143 | 10/1991 | Lee | 395/600 |
| 5,073,864 | 12/1991 | Methvin et al. | 364/715.11 |
| 5,144,072 | 9/1992 | Buzby, Jr. et al. | 564/82 |
| 5,168,571 | 12/1992 | Hoover et al. | 395/800 |
| 5,179,711 | 1/1993 | Vreeland | 395/775 |
| 5,228,133 | 7/1993 | Oppedahl | 395/425 |

OTHER PUBLICATIONS

Hirata et al. "A Versatile Data String–Search VLSI" Apr. 1988, IEEE Journal of Solid State.
"AIX Version 3.2 for RISC System/6000, Assembler Language Reference", Second Edition, International Business Machines Corp., pp. 5–156–5–158 (Jan. 1992).
"PA–RISC 1.1 Architecture and Instruction Set, Reference Manual", Hewlett Packard Company, pp. 5–6–5–7 & 5–109 (Nov. 1990).
"Am29050 Microprocessor, User's Manual", Advanced Micro Devices, Inc., pp. 8–38, (1991).

Primary Examiner—Krisna Lim
Attorney, Agent, or Firm—Helene Plotka-Workman

[57] ABSTRACT

The invention is an instruction for locating the address of a specific character or value within a byte string of variable length. An offset into a portion of the string is specified and the portion of the string is searched for a first occurrence of the specific character beginning at the specified offset. If the specific character is found, then the existence of the specific character is indicated and an address or offset of the specific character is saved or otherwise indicated. If the specific character is not found, then the non-existence of the specific character is indicated and a convenient address or offset for referencing the next character immediately following the portion of the string already examined is saved or otherwise indicated. The specific character can have a length of one or more bytes and can be a pre-defined fixed value or a dynamic arbitrary value. The invention can execute in a time period comparable to performing an arithmetic instruction. Moreover, the invention can be combined with other load and store instructions, so that a copy operation can be performed by invoking this instruction sequence one or more times.

21 Claims, 9 Drawing Sheets

| lsbs of gr[ra] | t0 | t1 | t2 | t3 | | found | offset |
|---|---|---|---|---|---|---|---|
| 0 | 0 | X | X | X | \| | 1 | 0 |
| 0 | 1 | 0 | X | X | \| | 1 | 1 |
| 0 | 1 | 1 | 0 | X | \| | 1 | 2 |
| 0 | 1 | 1 | 1 | 0 | \| | 1 | 3 |
| 0 | 1 | 1 | 1 | 1 | \| | 0 | 0 |
| 1 | X | 0 | X | X | \| | 1 | 1 |
| 1 | X | 1 | 0 | X | \| | 1 | 2 |
| 1 | X | 1 | 1 | 0 | \| | 1 | 3 |
| 1 | X | 1 | 1 | 1 | \| | 0 | 0 |
| 2 | X | X | 0 | X | \| | 1 | 2 |
| 2 | X | X | 1 | 0 | \| | 1 | 3 |
| 2 | X | X | 1 | 1 | \| | 0 | 0 |
| 3 | X | X | X | 0 | \| | 1 | 3 |
| 3 | X | X | X | 1 | \| | 0 | 0 |
| | | INPUTS | | | | OUTPUTS | |

FIG. 8A

| lsbs of gr[ra] | t0 | t1 | t2 | t3 | t4 | t5 | t6 | t7 | | found | offset |
|---|---|---|---|---|---|---|---|---|---|---|---|
| 0 | 0 | X | X | X | X | X | X | X | | 1 | 0 |
| 0 | 1 | 0 | X | X | X | X | X | X | | 1 | 1 |
| 0 | 1 | 1 | 0 | X | X | X | X | X | | 1 | 2 |
| 0 | 1 | 1 | 1 | 0 | X | X | X | X | | 1 | 3 |
| 0 | 1 | 1 | 1 | 1 | 0 | X | X | X | | 1 | 4 |
| 0 | 1 | 1 | 1 | 1 | 1 | 0 | X | X | | 1 | 5 |
| 0 | 1 | 1 | 1 | 1 | 1 | 1 | 0 | X | | 1 | 6 |
| 0 | 1 | 1 | 1 | 1 | 1 | 1 | 1 | 0 | | 1 | 7 |
| 0 | 1 | 1 | 1 | 1 | 1 | 1 | 1 | 1 | | 0 | 0 |
| 1 | X | 0 | X | X | X | X | X | X | | 1 | 1 |
| 1 | X | 1 | 0 | X | X | X | X | X | | 1 | 2 |
| 1 | X | 1 | 1 | 0 | X | X | X | X | | 1 | 3 |
| 1 | X | 1 | 1 | 1 | 0 | X | X | X | | 1 | 4 |
| 1 | X | 1 | 1 | 1 | 1 | 0 | X | X | | 1 | 5 |
| 1 | X | 1 | 1 | 1 | 1 | 1 | 0 | X | | 1 | 6 |
| 1 | X | 1 | 1 | 1 | 1 | 1 | 1 | 0 | | 1 | 7 |
| 1 | X | 1 | 1 | 1 | 1 | 1 | 1 | 1 | | 0 | 0 |
| 2 | X | X | 0 | X | X | X | X | X | | 1 | 2 |
| 2 | X | X | 1 | 0 | X | X | X | X | | 1 | 3 |
| 2 | X | X | 1 | 1 | 0 | X | X | X | | 1 | 4 |
| 2 | X | X | 1 | 1 | 1 | 0 | X | X | | 1 | 5 |
| 2 | X | X | 1 | 1 | 1 | 1 | 0 | X | | 1 | 6 |
| 2 | X | X | 1 | 1 | 1 | 1 | 1 | 0 | | 1 | 7 |
| 2 | X | X | 1 | 1 | 1 | 1 | 1 | 1 | | 0 | 0 |
| 3 | X | X | X | 0 | X | X | X | X | | 1 | 3 |
| 3 | X | X | X | 1 | 0 | X | X | X | | 1 | 4 |
| 3 | X | X | X | 1 | 1 | 0 | X | X | | 1 | 5 |
| 3 | X | X | X | 1 | 1 | 1 | 0 | X | | 1 | 6 |
| 3 | X | X | X | 1 | 1 | 1 | 1 | 0 | | 1 | 7 |
| 3 | X | X | X | 1 | 1 | 1 | 1 | 1 | | 0 | 0 |
| 4 | X | X | X | X | 0 | X | X | X | | 1 | 4 |
| 4 | X | X | X | X | 1 | 0 | X | X | | 1 | 5 |
| 4 | X | X | X | X | 1 | 1 | 0 | X | | 1 | 6 |
| 4 | X | X | X | X | 1 | 1 | 1 | 0 | | 1 | 7 |
| 4 | X | X | X | X | 1 | 1 | 1 | 1 | | 0 | 0 |
| 5 | X | X | X | X | X | 0 | X | X | | 1 | 5 |
| 5 | X | X | X | X | X | 1 | 0 | X | | 1 | 6 |
| 5 | X | X | X | X | X | 1 | 1 | 0 | | 1 | 7 |
| 5 | X | X | X | X | X | 1 | 1 | 1 | | 0 | 0 |
| 6 | X | X | X | X | X | X | 0 | X | | 1 | 6 |
| 6 | X | X | X | X | X | X | 1 | 0 | | 1 | 7 |
| 6 | X | X | X | X | X | X | 1 | 1 | | 0 | 0 |
| 7 | X | X | X | X | X | X | X | 0 | | 1 | 7 |
| 7 | X | X | X | X | X | X | X | 1 | | 0 | 0 |

INPUTS      OUTPUTS

|  | INPUTS | | | | | | OUTPUTS | | |
|---|---|---|---|---|---|---|---|---|---|
| equal | lsbs of qr[ra] | lsbs of qr[rd] | t0 | t1 | t2 | t3 | error | last | found | offset |
| 0 | 0 | X | 0 | X | X | X | 0 | 0 | 1 | 0 |
| 0 | 0 | X | 1 | 0 | X | X | 0 | 0 | 1 | 1 |
| 0 | 0 | X | 1 | 1 | 0 | X | 0 | 0 | 1 | 2 |
| 0 | 0 | X | 1 | 1 | 1 | 0 | 0 | 0 | 1 | 3 |
| 0 | 0 | X | 1 | 1 | 1 | 1 | 0 | 0 | 0 | 0 |
| 0 | 1 | X | X | 0 | X | X | 0 | 0 | 1 | 1 |
| 0 | 1 | X | X | 1 | 0 | X | 0 | 0 | 1 | 2 |
| 0 | 1 | X | X | 1 | 1 | 0 | 0 | 0 | 1 | 3 |
| 0 | 1 | X | X | 1 | 1 | 1 | 0 | 0 | 0 | 0 |
| 0 | 2 | X | X | X | 0 | X | 0 | 0 | 1 | 2 |
| 0 | 2 | X | X | X | 1 | 0 | 0 | 0 | 1 | 3 |
| 0 | 2 | X | X | X | 1 | 1 | 0 | 0 | 0 | 0 |
| 0 | 3 | X | X | X | X | 0 | 0 | 0 | 1 | 3 |
| 0 | 3 | X | X | X | X | 1 | 0 | 0 | 0 | 0 |
| 1 | 0 | 0 | 0 | X | X | X | 0 | 1 | 1 | 0 |
| 1 | 0 | 1 | 0 | X | X | X | 0 | 0 | 1 | 0 |
| 1 | 0 | 2 | 0 | X | X | X | 0 | 0 | 1 | 0 |
| 1 | 0 | 3 | 0 | X | X | X | 0 | 0 | 1 | 0 |
| 1 | 0 | 0 | 1 | 0 | X | X | 0 | 1 | 0 | 0 |
| 1 | 0 | 1 | 1 | 0 | X | X | 0 | 1 | 1 | 1 |
| 1 | 0 | 2 | 1 | 0 | X | X | 0 | 0 | 1 | 1 |
| 1 | 0 | 3 | 1 | 0 | X | X | 0 | 0 | 1 | 1 |
| 1 | 0 | 0 | 1 | 1 | 0 | X | 0 | 1 | 0 | 0 |
| 1 | 0 | 1 | 1 | 1 | 0 | X | 0 | 1 | 0 | 1 |
| 1 | 0 | 2 | 1 | 1 | 0 | X | 0 | 1 | 1 | 2 |
| 1 | 0 | 3 | 1 | 1 | 0 | X | 0 | 0 | 1 | 2 |
| 1 | 0 | 0 | 1 | 1 | 1 | 0 | 0 | 1 | 0 | 0 |
| 1 | 0 | 1 | 1 | 1 | 1 | 0 | 0 | 1 | 0 | 1 |
| 1 | 0 | 2 | 1 | 1 | 1 | 0 | 0 | 1 | 0 | 2 |
| 1 | 0 | 3 | 1 | 1 | 1 | 0 | 0 | 1 | 1 | 3 |
| 1 | 0 | 0 | 1 | 1 | 1 | 1 | 0 | 1 | 0 | 0 |
| 1 | 0 | 1 | 1 | 1 | 1 | 1 | 0 | 1 | 0 | 1 |
| 1 | 0 | 2 | 1 | 1 | 1 | 1 | 0 | 1 | 0 | 2 |
| 1 | 0 | 3 | 1 | 1 | 1 | 1 | 0 | 1 | 0 | 3 |
| 1 | 1 | 0 | X | 0 | X | X | 1 | (1) | (0) | (0) |
| 1 | 1 | 1 | X | 0 | X | X | 0 | 1 | 1 | 1 |
| 1 | 1 | 2 | X | 0 | X | X | 0 | 0 | 1 | 1 |
| 1 | 1 | 3 | X | 0 | X | X | 0 | 0 | 1 | 1 |
| 1 | 1 | 0 | X | 1 | 0 | X | 1 | (1) | (0) | (0) |
| 1 | 1 | 1 | X | 1 | 0 | X | 0 | 1 | 0 | 1 |
| 1 | 1 | 2 | X | 1 | 0 | X | 0 | 1 | 1 | 2 |
| 1 | 1 | 3 | X | 1 | 0 | X | 0 | 0 | 1 | 2 |
| 1 | 1 | 0 | X | 1 | 1 | 0 | 1 | (1) | (0) | (0) |
| 1 | 1 | 1 | X | 1 | 1 | 0 | 0 | 1 | 0 | 1 |
| 1 | 1 | 2 | X | 1 | 1 | 0 | 0 | 1 | 0 | 2 |
| 1 | 1 | 3 | X | 1 | 1 | 0 | 0 | 1 | 1 | 3 |
| 1 | 1 | 0 | X | 1 | 1 | 1 | 1 | (1) | (0) | (0) |
| 1 | 1 | 1 | X | 1 | 1 | 1 | 0 | 1 | 0 | 1 |
| 1 | 1 | 2 | X | 1 | 1 | 1 | 0 | 1 | 0 | 2 |
| 1 | 1 | 3 | X | 1 | 1 | 1 | 0 | 1 | 0 | 3 |
| 1 | 2 | 0 | X | X | 0 | X | 1 | (1) | (0) | (0) |
| 1 | 2 | 1 | X | X | 0 | X | 1 | (1) | (0) | (1) |
| 1 | 2 | 2 | X | X | 0 | X | 0 | 1 | 1 | 2 |
| 1 | 2 | 3 | X | X | 0 | X | 0 | 0 | 1 | 2 |
| 1 | 2 | 0 | X | X | 1 | 0 | 1 | (1) | (0) | (0) |
| 1 | 2 | 1 | X | X | 1 | 0 | 1 | (1) | (0) | (1) |
| 1 | 2 | 2 | X | X | 1 | 0 | 0 | 1 | 0 | 2 |
| 1 | 2 | 3 | X | X | 1 | 0 | 0 | 1 | 1 | 3 |
| 1 | 2 | 0 | X | X | 1 | 1 | 1 | (1) | (0) | (0) |
| 1 | 2 | 1 | X | X | 1 | 1 | 1 | (1) | (0) | (1) |
| 1 | 2 | 2 | X | X | 1 | 1 | 0 | 1 | 0 | 2 |
| 1 | 2 | 3 | X | X | 1 | 1 | 0 | 1 | 0 | 3 |
| 1 | 3 | 0 | X | X | X | 0 | 1 | (1) | (0) | (0) |
| 1 | 3 | 1 | X | X | X | 0 | 1 | (1) | (0) | (1) |
| 1 | 3 | 2 | X | X | X | 0 | 1 | (1) | (0) | (2) |
| 1 | 3 | 3 | X | X | X | 0 | 0 | 1 | 1 | 3 |
| 1 | 3 | 0 | X | X | X | 1 | 1 | (1) | (0) | (0) |
| 1 | 3 | 1 | X | X | X | 1 | 1 | (1) | (0) | (1) |
| 1 | 3 | 2 | X | X | X | 1 | 1 | (1) | (0) | (2) |
| 1 | 3 | 3 | X | X | X | 1 | 0 | 1 | 0 | 3 |

SYSTEM FOR FINDING AND SETTING ADDRESS PORTION OF VARIABLE-LENGTH CHARACTER STRING BY XOR-ING PORTION IN NUMBER OF BYTES WITHIN SINGLE INSTRUCTION

This is a continuation of application Ser. No. 08/077,528 filed Jun. 14, 1993, now abandoned.

FIELD OF THE INVENTION

This invention relates generally to the processing on a computer of byte strings ending with a termination character and, more specifically, to an instruction for a finding a termination character in a string of bytes for use on a computer.

BACKGROUND OF THE INVENTION

A common operation performed on a computer is copying a string of bytes or characters from one address in memory, a "source", to another address in memory, a "target". A string of bytes can have a fixed length or a variable length. Typically, when a string of bytes has a variable length, a termination character such as a null character, typically called a zero-byte character, is used to mark the end of the string of bytes. In that situation, a string of bytes is typically delineated or otherwise defined by the address of the first byte of the string and the termination character.

When a copy operation is implemented on a computer as a single instruction, it typically takes multiple cycles to complete. However, some RISC processors use an instruction sequence to perform this operation, where each instruction is executed in a single cycle.

On a RISC System/6000 processor produced by International Business Machines Corporation (IBM), a string with a pre-specified length or termination character is used to copy a variable-length string of bytes. In that approach, the specified number of bytes up to the termination character are copied, starting at the beginning of the string. A "Load String And Compare Byte Indexed" (lscbx) instruction is used to load consecutive bytes in storage into consecutive registers and then a store string instruction is used to copy those bytes from the registers back into storage. However, this approach typically uses multiple cycles to complete the instruction. This increases hardware and exception-handling complexity, since most other instructions on the processor are designed to be implemented in a single cycle.

The RISC System/6000 lscbx instruction is described in "AIX Version 3.2 for RISC System/6000, Assembler Language Reference", International Business Machines Corporation, Second Edition (January 1992), pg. 5-156 through pg. 5-158. RISC System/6000 is a trademark of International Business Machines Corporation. IBM is a registered trademark of International Business Machines Corporation.

In an approach used in Hewlett Packard Company's Precision Architecture (HP-PA), a UNIT XOR instruction can detect whether a word contains a zero byte. In that approach an exclusive-or operation is performed and hardware detection logic checks each resulting byte for a zero-byte value. A status result can be set to indicate whether any bytes in the resulting word were zero. However, this instruction does not indicate the location of the zero byte. Additional instructions are used to detect the actual location of the zero byte.

Moreover, additional instructions are used to handle leading bytes, i.e. data bytes in front of the starting address of the byte string being copied, by properly performing a logical OR on the word being tested and a disabling mask field. The overhead of generating and using the mask on leading bytes can be significant for copy operations performed on small byte strings.

For background information on Hewlett Packard's Precision Architecture and the UNIT XOR instruction in particular, see "PA-RISC 1.1 Architecture and Instruction Set Reference Manual", Hewlett Packard Company, Chapter 5, pgs. 5-7, 5- 109 (1990).

In an approach used in an AM29050 microprocessor by Advanced Micro Devices, Inc. (AMD), a CPBYTE instruction can be used to perform a byte-by-byte comparison between two registers to check for an arbitrary termination condition. One of the two registers contains a portion of the string being checked and the other register contains replicated copies of the termination character. The result of the comparison is an indication whether the termination character was found. As with the PA-RISC 1.1 approach, additional instructions are used to determine the location of the termination character and the start address of the string being copied.

The CPBYTE instruction is described in the "Am29050 Microprocessor, User's Manual", Advanced Micro Devices, Inc., (1991), page 8-38. Am29050 is a trademark of Advanced Micro Devices, Inc. AMD is a registered trademark of Advanced Micro Devices, Inc.

SUMMARY OF THE INVENTION

The invention is an instruction for locating the address of a specific character or value within a byte string of variable length. Briefly, according to the invention, an offset into a portion of the string is specified and the portion of the string is searched for a first occurrence of the specific character beginning at the specified offset. If the specific character is found, then the existence of the specific character is indicated and an address or offset of the specific character is saved or otherwise indicated. If the specific character is not found, then the non-existence of the specific character is indicated and a convenient address or offset for referencing the next character immediately following the portion of the string already examined is saved or otherwise indicated. In either case, the address or offset being saved or otherwise indicated can be saved for example, in a register, memory or other storage unit.

The specific character is typically a termination character used to terminate variable-length byte strings, also called character strings. The length of the termination character can be one or more bytes. If the termination character has a length exceeding one byte, then it is preferably aligned within the string. For example, in an 8-byte string having bytes numbered 0–7, a two-byte termination character is preferably located in bytes 0–1, 2–3, 4–5 or 6–7.

Typically, a termination character is a null character. The value of a null character is usually a zero byte as in ASCII, but this is language specific and the value could be different within different languages.

The termination character may be a pre-defined fixed value or it may be a dynamic arbitrary value. The value of a dynamic termination character can change between copy operations, while a termination character having a pre-defined fixed value remains constant.

When the termination character is a fixed value, then the invention as described above is particularly tailored to detect that termination character. In other words, the computer embodying the invention is hardwired to detect that specific termination character.

On the other hand, when the termination character is not known during the build process of a computer embodying the invention or when it is desired to permit a dynamic termination character to be used, a boolean exclusive-or is performed between data containing the portion of the string being tested and a reference value wherein each byte of the reference value contains the specific termination character. If it is feasible given the circuit technology being used, this exclusive-or can be performed within the instruction itself. Alternatively, it can be performed before the instruction is invoked.

Since a termination character is typically a zero byte, it may be preferable to have an instruction which is specifically designed to detect a zero byte. In that case, when it is desired to use the instruction to detect a character other than a zero byte, the exclusive-or operation can be performed before invoking the instruction. In this way, the overhead of the exclusive-or operation is not encountered when the termination character is a zero byte. This approach applies to fixed termination characters in general.

The invention can be used to copy byte strings from a source to a target in the following manner. During a single call of an instruction embodying the invention, a portion of the string having the same number of bytes as the size of a register can be tested for the specific character. The invention operates on multiple bytes within a register, rather than a single byte at a time, thereby yielding a significant performance improvement over software that copies one byte at a time.

The invention can execute in a time period comparable to performing an arithmetic instruction; special hardware for performing multiple cycle instructions is not needed to practice the invention. The invention can be combined with other load and store instructions, so that a copy operation can be performed by invoking this instruction sequence one or more times.

The invention also provides several advantages over processors with an architecture like HP-PA and Am29050. First, by specifying an offset into the portion of the string being searched, the invention explicitly ignores leading bytes without masking them out, thereby eliminating the overhead associated with such masking operations. Second, additional instructions are not needed to determine the location of the termination character, because the invention can determine that information within its single cycle throughput. This reduces processing time.

BRIEF DESCRIPTION OF THE DRAWINGS

The above and further advantages of the invention may be better understood by referring to the following description in conjunction with the accompanying drawings, in which:

FIG. 10 shows a four-byte truth table containing the boolean logic for the combinatorial logic unit of FIG. 9.

DETAILED DESCRIPTION OF THE DRAWINGS

Figure 1:
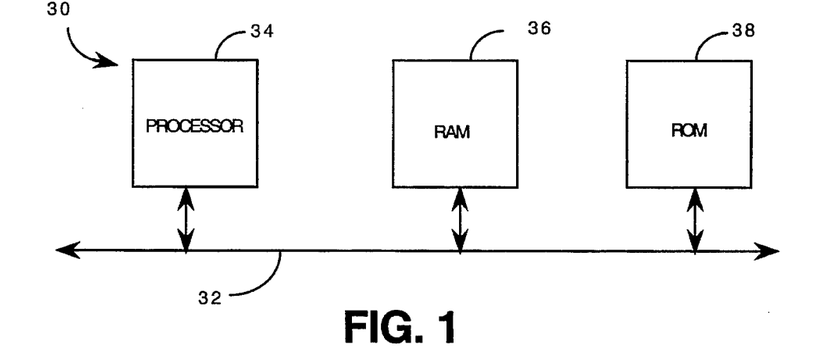
FIG. 1 is a symbolic, simplified block diagram of a system which may incorporate the invention.

Numeral 30 in FIG. 1 generally indicates a computer of the type which can incorporate the invention. Computer 30 comprises signal paths 32, e.g. a system bus, interconnecting a processor 34, a main memory which is typically implemented in the form of a random access memory (RAM) 36 and a static memory that can comprise a read only memory (ROM) 38.

The processor 34 is a microprocessor having a load/store architecture. For example, the processor may be a SPARC microprocessor commercially available from Sun Microsytems, Inc. or a RISC System/6000 microprocessor commercially available from International Business Machines Corporation.

Figure 2:
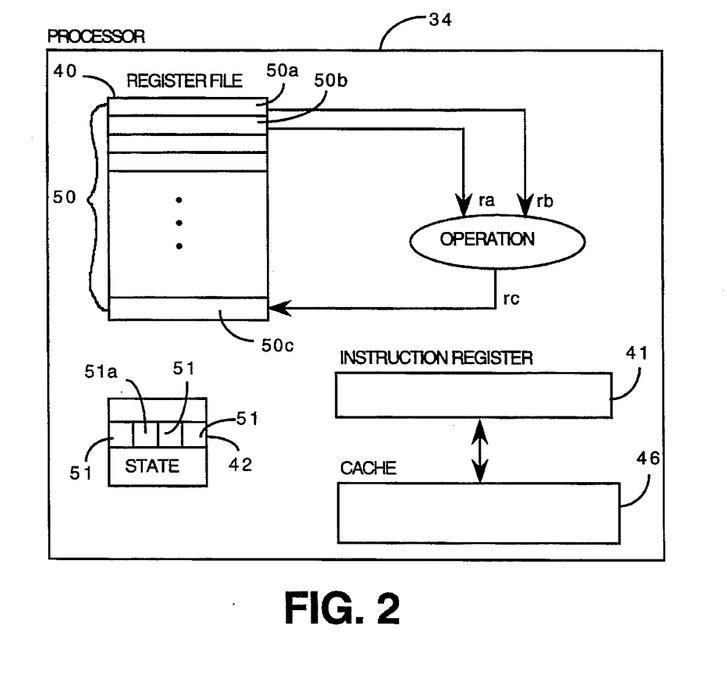
FIG. 2 is a block diagram of a processor of the system of FIG. 1.

As shown in FIG. 2, the processor 34 contains a register file 40 and an instruction register 41. Optionally, the processor 34 contains a statebit storage 42 and a cache 46. In a traditional load/store architecture data is moved between registers and memory without computation and computation is performed between values in registers.

Register file 40 contains a plurality of general registers 50 including a register "ra" 50$a$, a register "rb" 50$b$ and a register "rc" 50$c$. These registers are a specified byte length, typically 4 or 8 bytes depending on the implementation. The format of the contents of a register depends on the memory addressing scheme used. In Big Endian memory addressing, byte 0 of the register contains the most significant bit of the contents, i.e. the bytes in the register are consecutively numbered from left to right starting with 0. In Little Endian memory addressing, byte 0 of the register contains the least significant bit of the contents, i.e. the bytes in a register are consecutively numbered from right to left starting with 0. The preferred embodiment is described in conjunction with registers using Big Endian memory addressing. However, the adaptation of the embodiment to a register using Little Endian memory addressing would be obvious to a person of ordinary skill in the art.

Statebit storage 42 contains one or more statebits 51, including a statebit 51$a$ for controlling instructions. The processor can set one or more statebits 51 in order to indicate particular condition codes or states. Rather than having a statebit storage 42, a processor 34 could use a register 50 within the register file 40.

Figure 3:
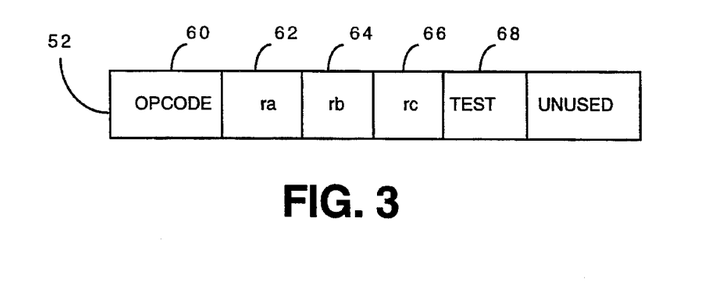
FIG. 3 shows a format of an instruction incorporating the invention.

Typically, a processor 34 fetches an instruction 52 from cache 46 or memory 36 and stores it in the instruction register 41. FIG. 3 shows a format for an instruction 52 for implementing the invention. A typical instruction 52 contains an opcode 60, three register number fields, herein called ra specifier 62, rb specifier 64 and rc specifier 66, and, optionally, a test field 68.

An opcode 60, also known as a "first field", specifies a particular instruction within the processor's instruction set. The opcode 60 uniquely identifies a particular instruction, either directly or indirectly. For example, opcode 60 can be a binary value such as "110000", corresponding to an instruction embodying the invention. The size of opcode 60 depends on the instruction set architecture, typically this is a 6-bit field.

For descriptive purposes, an instruction embodying the invention will herein be called a "FINDARBCHAR" or a "FINDFIXEDCHAR" instruction. A FINDARBCHAR instruction is substantially the same as a FINDFIXEDCHAR instruction, except that it is explicitly designed to handle an arbitrary or dynamic termination character, whereas FINDFIXEDCHAR is tailored to a specific fixed termination character such as a zero byte. Thus, in a situation where it is desired to provide the ability to change the termination character or where the termination character is unknown when a computer is built, the FINDARBCHAR instruction is preferable. When the termination character is dynamic, it is typically stored in a register 50.

A FINDFIXEDCHAR instruction can also be used for arbitrary or dynamic termination characters or when a termination character is unknown when a computer is built. In that case, the FINDFIXEDCHAR instruction is designed for a termination character equal to a zero byte. Before the FINDFIXEDCHAR instruction is called an EXCLUSIVE-OR is performed between data containing a portion of the string being searched and a mask of the same length having each byte set to the termination character before calling a FINDFIXEDCHAR instruction, thereby setting the byte containing the termination character to a zero byte. The FINDFIXEDCHAR is then used to locate that zero byte, thereby implicitly handling a termination character which is not a zero byte. In the case of a FINDARBCHAR instruction, the EXCLUSIVE-OR previously described is performed within the instruction itself.

The ra specifier 62, also known as a "second field" specifies register ra 50a. Ra specifier 62 can be an index, offset or pointer into the register file for register ra 50a.

The rb specifier 64, also known as a "third field", specifies register rb 50b. Rb specifier 64 is similar to Ra specifier 62.

The rc specifier 66, also known as a "fourth field", specifies register rc 50c. Rc specifier 66 is similar to Ra specifier 62 and Rb specifier 64.

The size of the three register fields 62, 64 and 66 depends on the number of registers supported. Typically, they are 5-bit fields.

Optionally, the test field 68, also known as a "fifth field", specifies which condition codes should be set. Typically these condition codes are used to nullify branches or other instructions. If there are multiple statebits 51 which may be set, test field 68 selects which of those are used.

An assembly language instruction for FINDFIXEDCHAR or FINDARBCHAR can be denoted as: FBYTE ra, rb, rc, test. Typically, a compiler in translating a higher level copy instruction would generate the FBYTE instruction including all necessary preceding, following and control instructions to complete the character string copy. Alternatively, the source code itself might call a routine written in assembly language to perform the copy operation.

Figure 4:
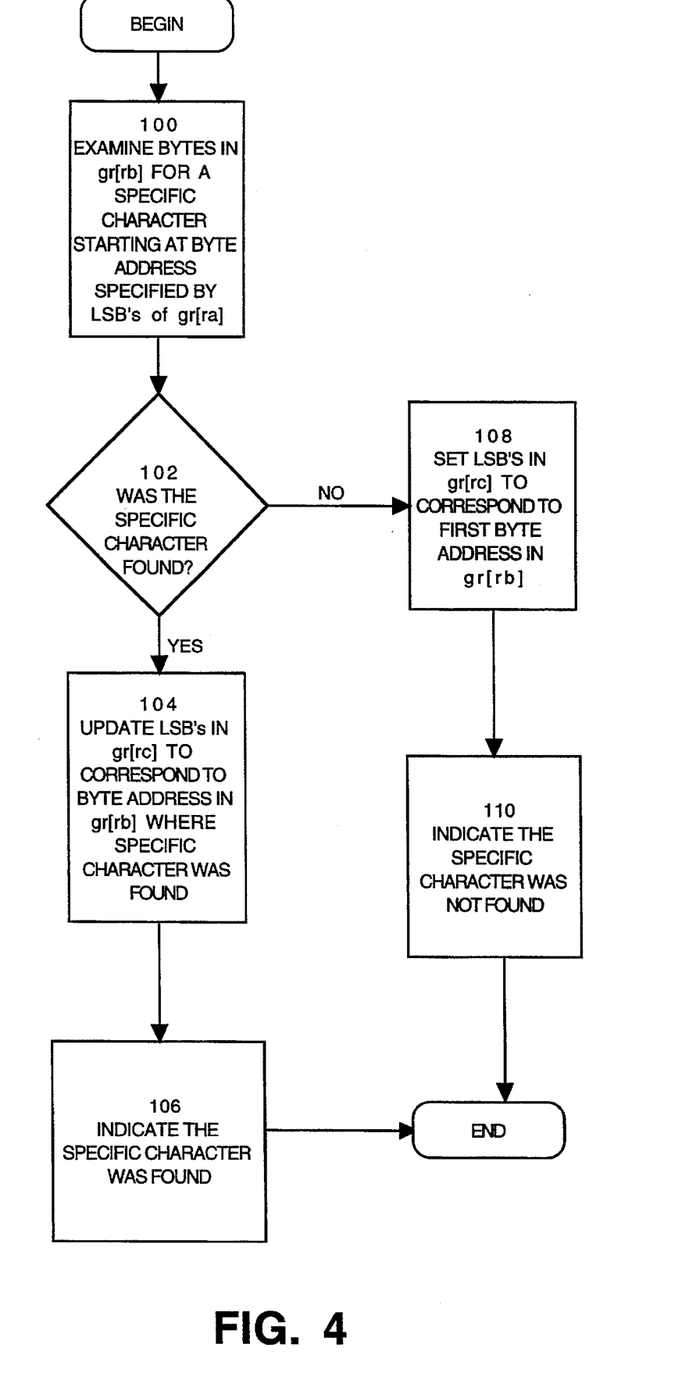
FIG. 4 is a flow chart of the general steps for finding a specific character in a register of bytes according to the invention.

FIG. 4 shows the general steps which are performed during execution of a FINDFIXEDCHAR instruction. Essentially, at block 100, the bytes of gr[rb] starting with the byte address specified by the least significant bits, herein called "lsb's", of gr[ra] are examined for a specific character, i.e. a termination character or other specified character. The number of least significant bits used depends on the size of a register, i.e. the number of bits needed to describe all of the byte locations. For example, if a register has a length of four bytes, then two bits are used to describe locations 0–3 and if a register has a length of eight bytes, then three bits are used to describe locations 0–7.

If the specific character is found at block 102, then at block 104 gr[rc] is updated to specify the byte address of that termination character and at block 106 it is indicated via an indicating means that the specific character was found. For example, this indicating means can be a condition code which is set or a trap which is executed. Blocks 104 and 106 can be performed in any order. If at block 102 the specific character is not found, then at block 108 gr[rc] is updated to specify the address of the byte in the string immediately following the bytes of string just examined or a convenient value for generating this address. At block 110 it is indicated that the specific character was not found. For example, this indicating means can be a condition code which is set or a trap which is executed. Blocks 108 and 110 can be performed in any order.

Alternatively, before block 100, if a condition code is being used as the indicating means, the condition code can be initialized to indicate that the specific character has not been found and then only updated when the specific character is found, i.e. the step performed at block 110 would be performed prior to block 100, rather than after blocks 102 and 108. Likewise, the condition code can be initialized to indicate that the specific character has been found and then only updated when the specific character is not found during the examination performed at block 100, i.e. the steps performed at block 106 are performed prior to block 100, rather than after blocks 102 and 104.

The condition code is preferably a conditional bit such as a statebit 51 that can be readily tested. Alternatively, the condition code can be a register loaded with a value indicating whether the specific character has been found.

Figure 5:
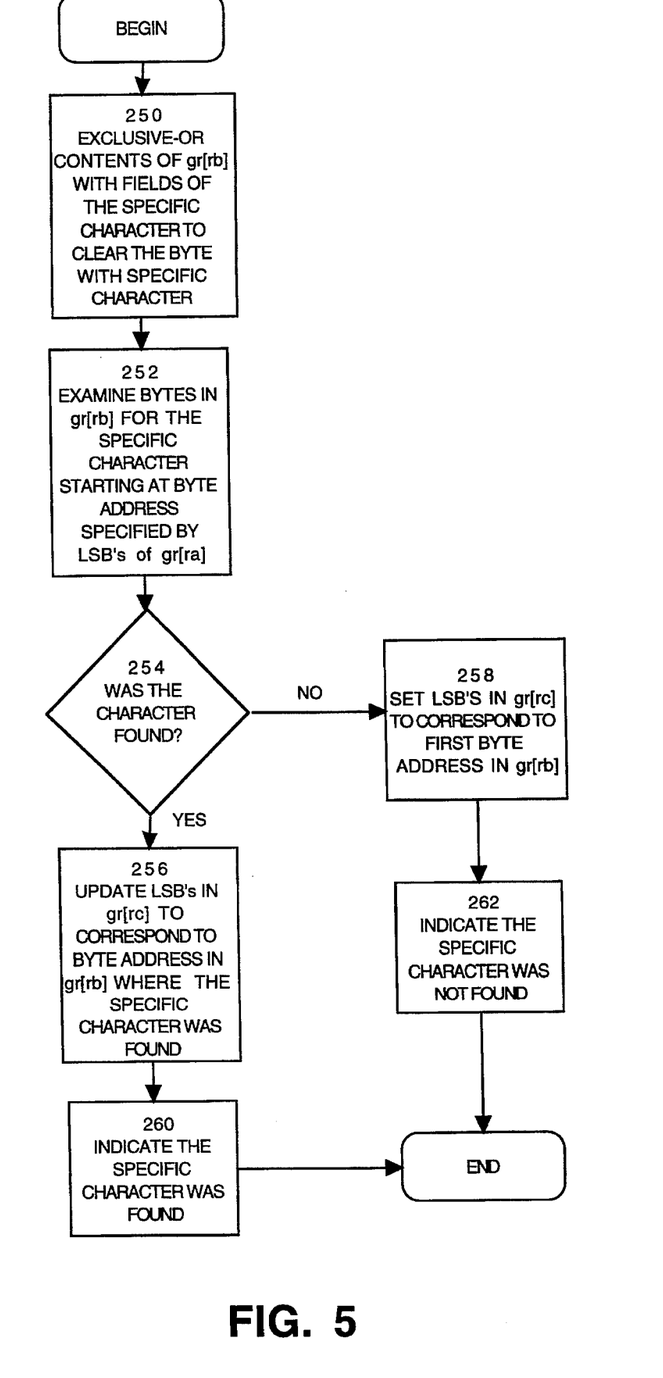
FIG. 5 is a flow chart of the general steps for finding an arbitrary character in a register of bytes according to the invention.

FIG. 5 shows generally steps which are performed during execution of a FINDARBCHAR instruction. Basically, the same steps as those performed in a FINDFIXEDCHAR instruction are executed, except that at block 250, the contents of gr[rb] are logically EXCLUSIVE-OR'ed with a mask field. The mask field is the same length as the portion of the string being examined, i.e. the same size as gr[rb], and contains a string of instances of the specific termination character being searched for.

Figure 6:
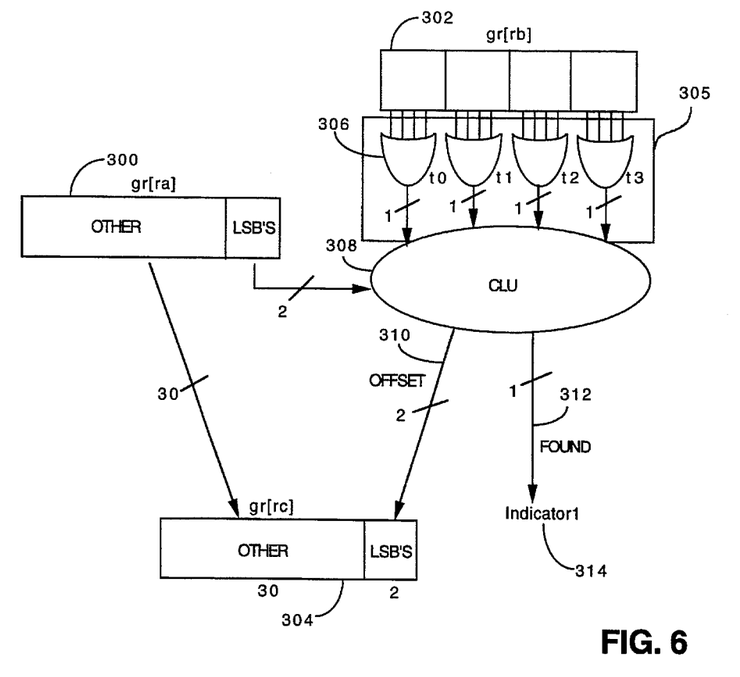
FIG. 6 shows a first embodiment of a hardware implementation incorporating the invention.
Figure 7:
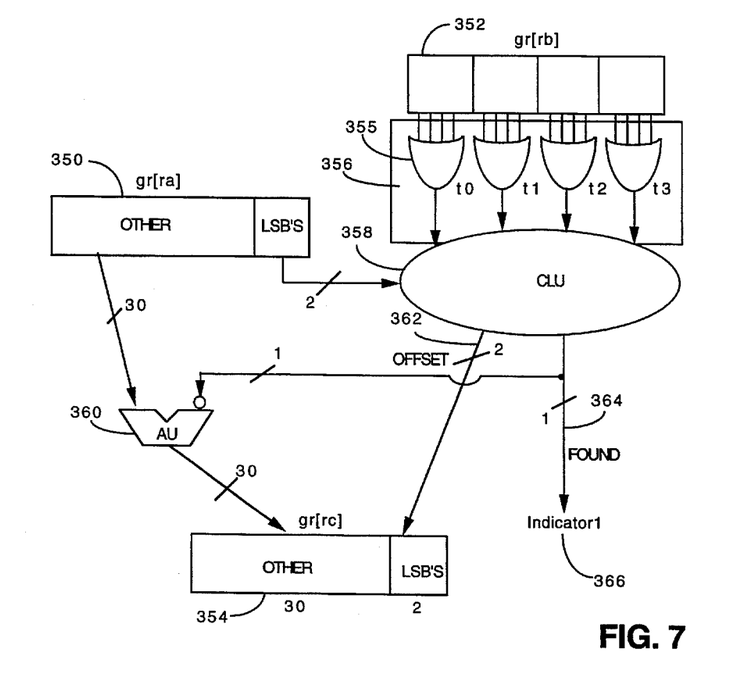
FIG. 7 shows a second embodiment of a hardware implementation incorporating the invention.
Figure 8A:
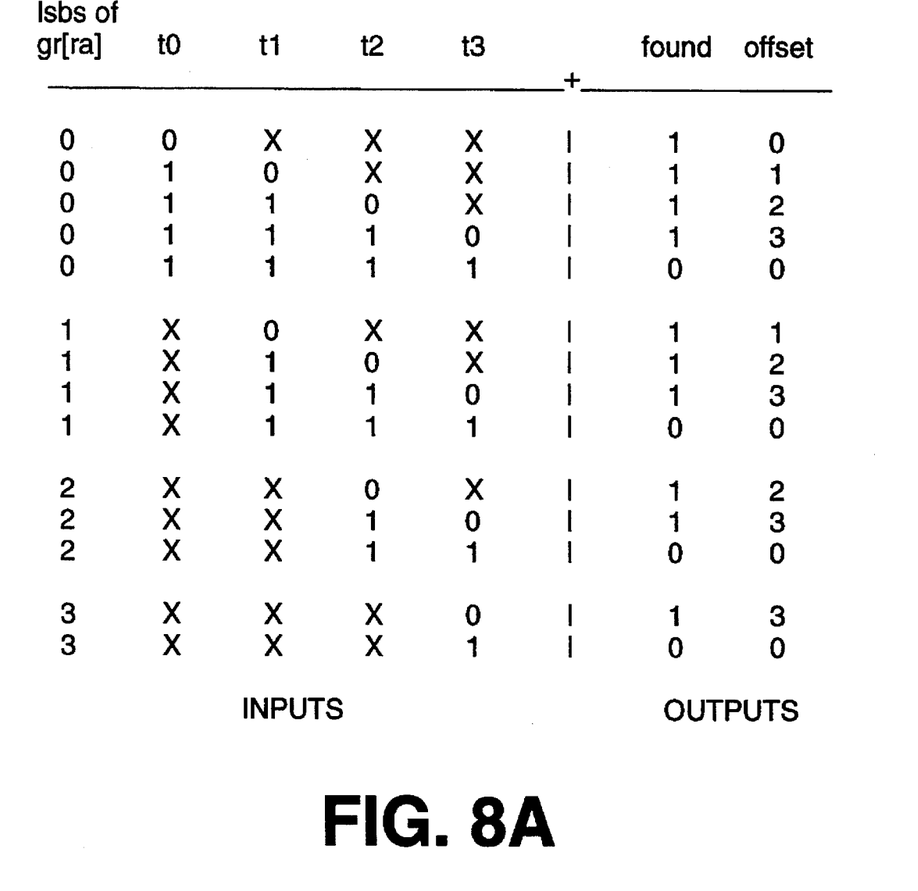
FIGS. 8A and 8B are four-byte and eight-byte, respectively, truth tables, each containing the boolean logic for the combinatorial logic units of FIGS. 6 and 7.
Figure 8B:
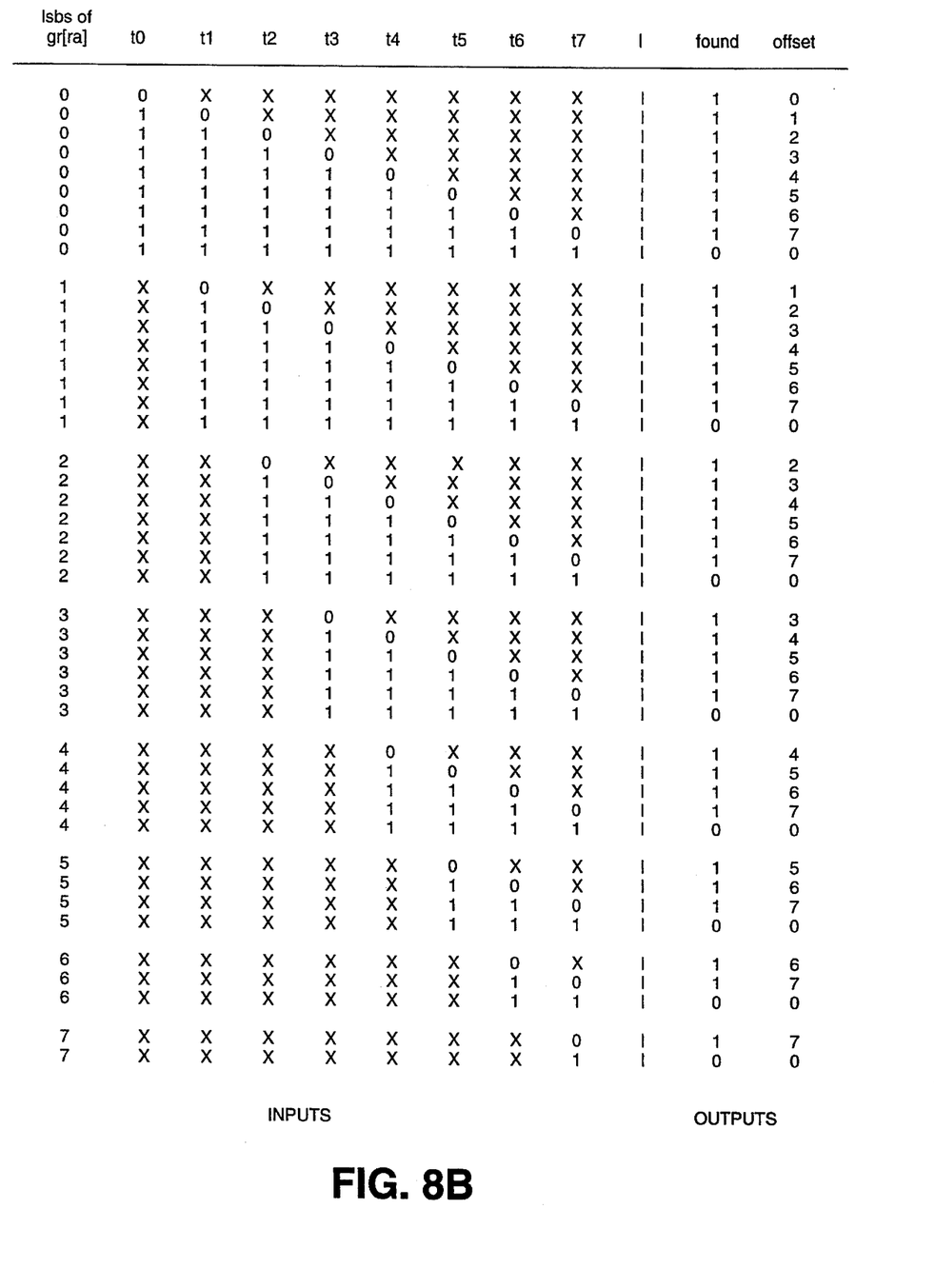
Figure 9:
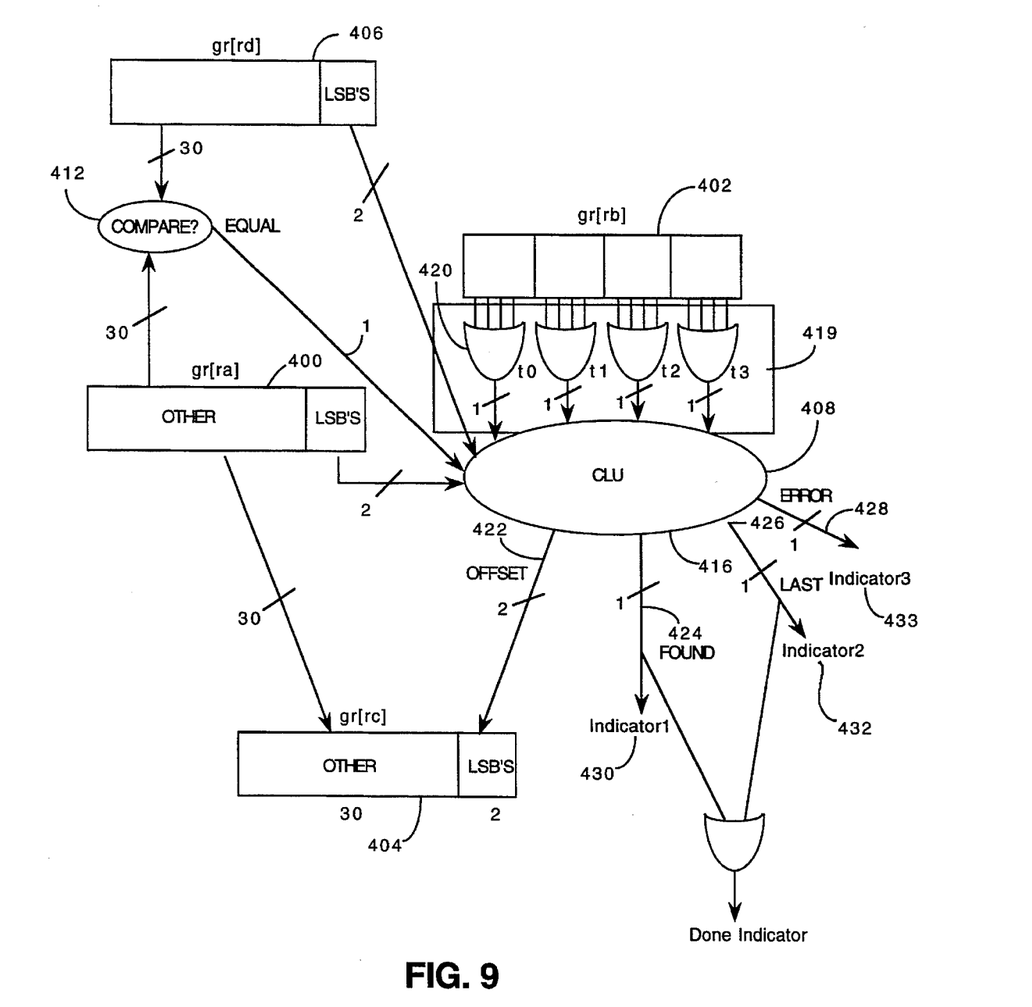
FIG. 9 shows a third embodiment of a hardware implementation incorporating the invention.

FIGS. 6–10 show alternative hardware implementations of an FINDFIXEDCHAR instruction embodying the invention. In FIGS. 6, 7 and 9, 4-byte registers are used, but the implementation can be used on registers of other sizes such as 8-byte registers. A diagonal line through a connection indicates the number of signal or data paths. FIGS. 6, 7 and 9 show an implementation for a termination character having a length of one byte. However, a person of ordinary skill in the art could modify FIGS. 6, 7 and 9 for a termination character having a length greater than one byte.

In FIG. 6, if a termination character is not found in the portion of the string being tested, then the least significant bits of gr[ra] are cleared so that another instruction can then generate the next character address by adding a constant "n", where n is the number of bytes within register gr[rb]. Alternatively, in FIG. 7, if a termination character is not found, then within that FINDFIXEDCHAR instruction the least significant bits of gr[ra] are cleared and then the constant "n" is added thereto.

In FIG. 6 three registers gr[ra] 300, gr[rb] 302 and gr[rc] 304 are interconnected in the following manner. Bits within each byte of register gr[rb] 302 are connected to logic 305 for comparing a byte with a termination character. The logic can be for example one or more OR-gates 306 or Or-gate equivalents such as NAND-gates using complemented input values (not shown).

A combinatorial logic unit ("CLU") 308 such as a Programmable Logic Array (PLA) interconnects the outputs of the logic 305, depicted as OR-gates 306, and the least significant bits of register gr[ra] 300. The other bits of register gr[ra] are connected to corresponding bits within register gr[rc] 304. The outputs of the CLU 308 are an offset signal 310 and a found signal 312. The least significant bits of register gr[rc] 304 are set to the value of the offset signal 310. The found signal 312 may be used to set a condition code by passing the contents to an indicator1 314 which can be, for example, a statebit 51.

The least significant bits of register gr[ra] 300 indicate which byte within register gr[rb] 302 to begin searching for the termination character and the other bits of gr[ra] indicate an address where the contents of that byte are located in memory.

In operation, the bits of the bytes within register gr[rb] 302 are virtually simultaneously passed through the logic 305, depicted as one OR-gate 306 per character. The results (t0 through t3) are passed into the CLU 308. The least significant bits of register gr[ra] 300 are also passed as an input into the CLU 308 and the other bits of register gr[ra] are copied into corresponding locations in register gr[rc] 304.

The CLU 308 produces two outputs, an offset signal 310 and a found signal 312. The found signal 312 specifies whether the termination character was found in register gr[rb] 302. If the termination character was found, then the offset signal 310 specifies the location of the termination character within gr[rb] 302. Otherwise, the offset signal 310 is zero. The least significant bits of register gr[rc] 304 are set to the value of the offset signal 310.

In an alternative embodiment shown in FIG. 7, if a termination character is not found, then the address of register gr[ra] is updated to specify the address of the next unexamined byte in the string. In this embodiment, three registers gr[ra] 350, gr[rb] 352 and gr[rc] 354 are interconnected in the following manner. The bits of the bytes of register gr[rb] 352 are connected to logic 355 for comparing a byte with a termination character. The logic can be for example one or more OR-gates 356 or Or-gate equivalents.

A combinatorial logic unit ("CLU") 358 such as a Programmable Logic Array (PLA) interconnects the outputs of the logic 355, depicted as OR-gates 356, and the least significant bits of register gr[ra] 350. The other bits of register gr[ra] are input into an addition unit ("AU") 360 capable of performing an add operation such as incrementing an operand by 1. For example, AU 360 can be an adder.

The outputs of the CLU 358 are an offset signal 362 and a found signal 364. The contents of the offset signal 362 are copied into the least significant bits of register gr[rc] 354.

The inverse of the value of the found signal 364 is passed as input to the AU 360. The output of the AU 360 is connected to the corresponding most significant bits in gr[rc] 354. The found signal 364 can also be used to set condition codes by passing the value to an indicator1 366 which is, for example, a statebit 51.

In operation, the bits within the bytes of register gr[rb] 352 are virtually simultaneously passed through logic 355, depicted as one OR-gate 356 per byte. The results (t0 through t3) are passed into the CLU 358. The least significant bits of register gr[ra] 350 are passed as a second input into the CLU 358 and the other bits of register gr[ra] are passed as an input into the AU 360.

If the termination character was found, then the offset signal 362 specifies the location of the termination character within gr[rb] 352. Otherwise, the offset signal 362 is zero, which specifies the first byte location of gr[rb] 352. The least significant bits of register gr[rc] 354 are set to the value of the offset signal 362.

The inverse of the value of the found signal 364 is passed into the AU 360. If the found signal is zero, indicating that the termination character was not found, then the AU 360 adds one to the address specified as the other input to the AU and the corresponding most significant bits in gr[rc], i.e. the bits other than the least significant bits, are set to the result. If the found signal is one, indicating that the termination character was found, then the AU 360 output is the address specified as the other input and the corresponding most significant bits in gr[rc] are set to the result.

FIGS. 8A and 8B shows two truth tables for the PLA's 304 and 358 in FIGS. 6 and 7. Each of these truth tables can be used as input to a logic synthesis program such as Synopsis, commercially available from Synopsis Corp., to generate appropriate gate-level interconnect specifications or a PLA description. FIG. 8A shows a four-byte truth table, while FIG. 8B shows an eight-byte truth table.

In the truth tables, an "X" denotes that the same outputs are generated whether that input value is 0 or 1.

FIG. 9 shows a hardware implementation for an embodiment of the invention in which an end byte in a string of bytes can be specified such that a byte string will be searched for a termination character until the termination character is found or until the specified end byte is searched, whichever occurs first. Four registers gr[ra] 400, gr[rb] 402 and gr[rc] 404 and gr[rd] 406 are interconnected in the following manner. When the most significant bits of gr[ra] and gr[rd] are equal, the least significant bits of a register gr[rd] 406 indicate a byte within register gr[rb] 342 to search up to, including that byte, for the termination character and the other bits of gr[rd] indicate an address where the contents of that byte are located in memory. If a termination character is found before reaching the byte specified by gr[rd], the search terminates.

The least significant bits of register gr[rd] are passed as an input into a combinatorial logic unit 408. The bits of gr[rd] other than the least significant bits are connected as an input to a comparison logic unit 412. The bits of gr[ra] other than the least significant bits are also connected as an input to the comparison logic unit 412. The result of the comparison logic unit 412 is passed as an input to the CLU 408. The least significant bits of gr[ra] 400 are also passed as an input to the CLU 408.

The bits within the bytes of register gr[rb] 402 are connected to logic 419 for comparing a byte with a termination character. The logic 419 can be for example one or more OR-gates 420 or Or-gate equivalents. The outputs of the logic 419, e.g. OR-gates 420, are also inputs to the CLU 408. The other bits of register gr[ra] 400 are connected to corresponding bits within register gr[rc] 404.

The outputs of the CLU 408 are an offset signal 422, a found signal 424, a last signal 426 and, preferably, an error signal 428. The offset signal 422 is connected to the least significant bits of gr[rc] 404. To set condition codes using the found signal 424 can be connected to an indicator1 430, the last signal 426 can be connected to an indicator2 432 and the error signal 428 can be connected to an indicator 433. Indicators 430, 432 and 433 can be, for example, statebits 51. Optionally, rather than using both indicator1 and indicator2, a single indicator, also called a done indicator 434, can be used to indicate that the search has terminated. The done indicator has a value which is equal to the result of performing a logical OR operation on the values of the found signal 424 and the last signal 426. Although a done indicator can specify that either a termination character was found or the last character was examined, it does not indicate which of the two situations occurred. Also, the error signal 428 may be ignored in some implementations.

In operation, the bits of gr[rd] 406 other than the least significant bits and the bits of gr[ra] 400 other than the least significant bits are passed as input into the comparison logic unit 412 which compares the two values and indicates whether they are equal, i.e. returning 1 if equal and 0 otherwise. The values are equal when the address of the byte being searched contains the address of the last byte to be searched. The output of the comparison logic unit 412 is passed as an input to the CLU 408.

The bits in the bytes of register gr[rb] 402 are virtually simultaneously passed through logic 419, depicted as one OR-gate 420 per byte. The results (t0 through t3) are passed into the CLU 408. The least significant bits of registers gr[ra] 400 and gr[rd] 406 are also passed as inputs into the CLU 408. The other bits of register gr[ra] 400 are copied into corresponding locations in register gr[rc] 404.

In FIG. 9, the CLU 408 produces four outputs, the offset signal 422, the found signal 424, the last signal 426 and the error signal 428. The error signal 428 is optional and the found signal 424 and the last signal 426 can be combined into a done signal. The found signal 424 specifies whether the termination character was found in register gr[rb] 402. If the termination character was found, then the offset signal 422 specifies the location of the termination character within gr[rb] 402. Otherwise, the offset signal 422 specifies the first byte location of gr[rb] 402. The least significant bits of gr[rc] 404 are set to the value of the offset signal 422.

The implementation described in FIG. 9 can be modified to handle a dynamic termination character by adding the exclusive-OR implementation described in conjunction with FIG. 7. Similarly, the implementation described in FIG. 9 can be modified to include an addition unit as described in conjunction with FIG. 7.

FIG. 10 shows a four-byte truth table for the PLA 408 in FIG. 9. As with the truth tables of FIGS. 8A and 8B, this truth table can be used as input to a logic synthesis program. In the truth tables, an "X" denotes that the same outputs are generated whether that input value is 0 or 1.

Values in parentheses indicate error conditions, i.e. when an ending address is less than a beginning address. In general, other data values are ignored when an error condition occurs, but some processors may not check for such errors. Therefore, in the table, outputs are defined for error conditions. The values indicated in the table are preferred values for the error, but any alternative value can be used.

Figure 11:
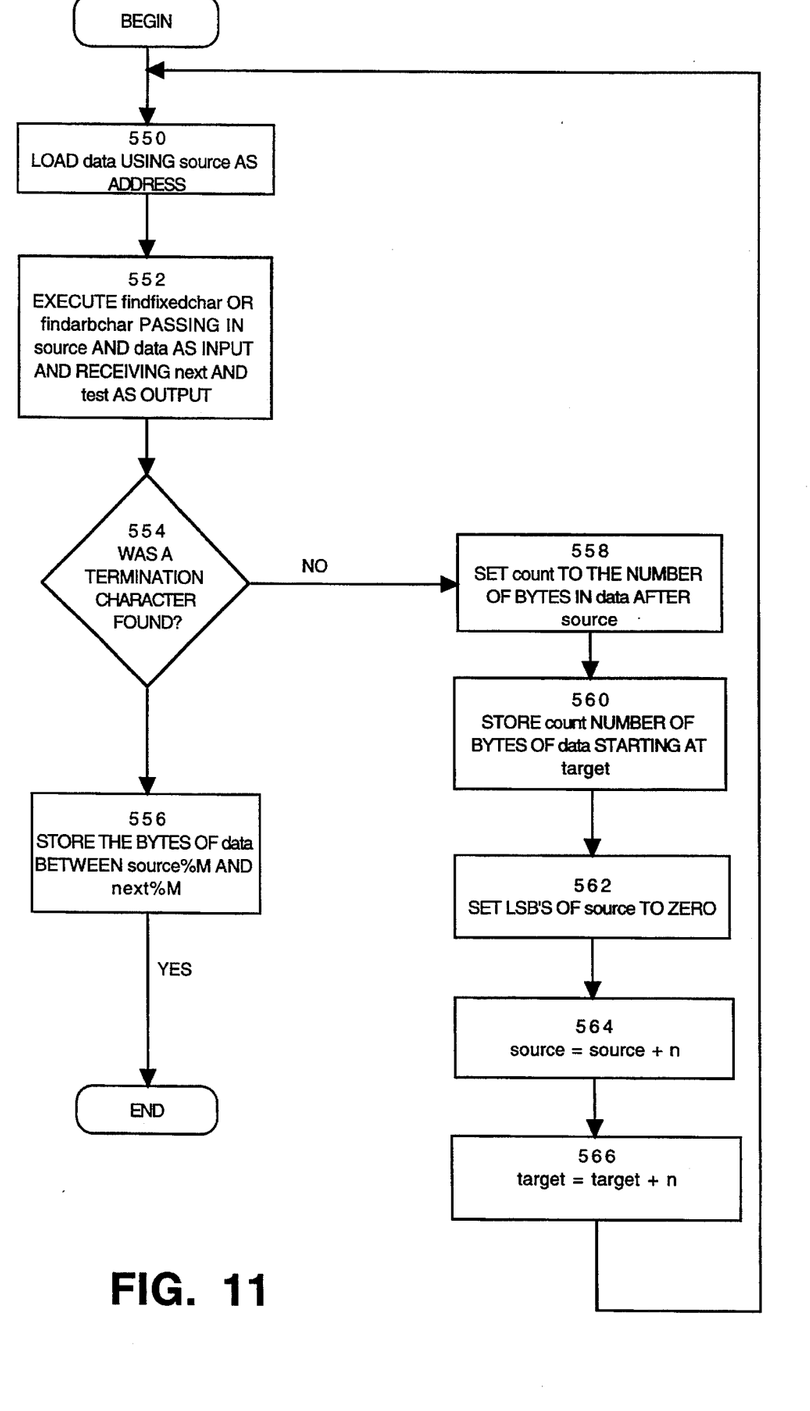
FIG. 11 is a flow chart of the steps for using an instruction embodying the invention to copy a byte string ending in a termination character from a source address to a target address.

FIG. 11 shows the steps performed when using a FIND-FIXEDCHAR instruction to copy a null-terminated byte string from a source address to a target address. FIG. 11 can be modified to use a FINDARBCHAR instruction, as well.

These steps are performed in response to a copy directive or subroutine call within a higher level computer programming language. The copy directive can be denoted, for example, as COPY(source, target), where the source parameter specifies an address of a byte string ending with a termination character and the target parameter specifies an address to which that string should be copied. It assumes that the source and target addresses have already been loaded into registers or other relatively readily accessible temporary storage. For illustrative purposes, the register into which the source address is loaded is called gr[ra].

For simplicity, it is assumed in the description of FIG. 11 that the least significant bits of the source and target addresses, i.e. the bits which specify the byte offset within a register) are the same. Otherwise, additional alignment calculations and data shifting instructions are used.

Basically, the string of bytes is copied from the source address to the target address by copying a register-full of bytes at a time. A register-full of bytes is loaded into a register gr[rb] and the contents beginning at an offset within gr[rb] specified by the least significant bits of gr[ra] are examined for a termination character. If the termination character is found then the contents of gr[rb] between the location specified by the least significant bits of gr[ra] and the location of the termination character, inclusive, are stored into appropriate addresses as specified by the target address. If the termination character is not found, then the contents of gr[rb] starting at the offset specified by the least significant bits of gr[ra] until the end are stored into appropriate addresses as specified by the target address and gr[ra] is updated to specify the address of the next character to be copied.

Specifically, as shown in FIG. 11, at block 550, data is loaded into gr[rb] using the source address. At block 552, a FINDFIXEDCHAR or a FINDARBCHAR instruction is performed. Preferably, the source address, i.e. gr[ra], and the data, i.e. gr[rb] are passed as parameters to the call. A general register gr[rc], also called "next", and a testbit, herein called "test", are used as output parameters.

At block 554, a check is performed to determine whether a termination was found at block 552. If so, control passes to block 556; otherwise, control passes to block 558. At block 556, where "n" denotes the number of bytes in gr[rb], the bytes of data in gr[rb] between the modulo of the source and n, i.e. the remainder of dividing source by n, and the modulo of next and n are stored into the target address.

At block 558, a count is set to the number of bytes in gr[rb] after and including the byte specified by source. At block 560, a count number of bytes of gr[rb] are stored starting at the target address. At block 562, the least significant bits of source are set to zero. At block 564, source is incremented by n. At block 566, target is incremented by n. Blocks 564 and 566 can be performed in any order. Then, control passes to block 550.

The steps in FIG. 11 can be modified to specify an end byte within gr[rb] as well as the starting byte.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for copying a variable-length character string ending in a specific character from a source address to a target address, said method comprising the steps of:

loading a portion of the character string using the source address;

storing a portion of the character string in a first register;

specifying a starting location referring to a location within the first register;

receiving at the processor an instruction; and executing said instruction, performing the following steps during execution of said instruction:

concurrently comparing to the specific character the characters which are stored in the first register at a location equal to or subsequent to the starting location if the specific character is found, then saving in a register an address indicating a location of the specific character; and if the specific character is not found, then saving in a second register an address for referencing a character in the character string immediately following the examined portion of the character string, if the specific character was found, then storing at the target address the bytes of the portion of the character string between the source address and the address of the termination character, inclusive; and if the specific character was not found, then storing at the target address the portion of the character string from the beginning of the byte specified by the source address until the end of the portion of the character string, incrementing the source address by the length of the portion of the character string, incrementing the target address by the length of the portion of the character string and setting the least significant bits of the source address to zero.

2. A method for finding a dynamic character other than a character represented by a zero value in a variable-length character string on a processor, said method comprising the steps of:

receiving at the processor an instruction; and in response to the instruction, executing the following steps during execution of the instruction:

performing an exclusive-OR operation between a portion of the character string being searched and a reference value, wherein the reference value contains a replicated series of the dynamic character; and if the exclusive-OR operation yields a zero result at any character location, then saving in a register an address indicating the location of that zero result and if the exclusive-OR operation does not yield a zero result at any character location, then saving in a register an address for referencing a character in the character string immediately following the examined portion of the character string.

3. A method as defined in claim 2 further comprising the step of indicating whether the exclusive-OR operation yields a zero result at any examined byte location.

4. A method for finding a specific character in a variable-length character string stored in a memory accessible to a processor, said method comprising the steps of:

storing a portion of the character string in a first register;

specifying a starting location referring to a location within the first register;

receiving at the processor an instruction; and in response to said instruction executing the following steps within a single instruction:

concurrently comparing to the specific character the characters which are stored in the first register at a location equal to or subsequent to the starting location if the specific character is found, then saving in a second register an address indicating a location of the specific character; and if the specific character is not found, then saving in a second register an address for referencing a character in the character string following the examined portion of the character string.

5. A method as defined in claim 4 wherein the specific character is a dynamic value.

6. A method as defined in claim 4 wherein the specific character is a null character.

7. A method as defined in claim 4 wherein the specific character has a length of one byte.

8. A method as defined in claim 4 wherein the specific character has a length of two or more bytes.

9. A method as defined in claim 4 wherein receiving an instruction is limited to a single instruction.

10. A method as in claim 4 further comprising the step of indicating by the processor whether the specific character was found.

11. A method as defined in claim 10 wherein indicating whether the specific character was found includes setting a condition code.

12. An apparatus for finding a specific character, said apparatus for use during execution of a single instruction by a processor, said apparatus capable of being used repeatedly to find a specific character in a variable-length character string on a computer, said apparatus comprising:

a first register capable of saving one or more characters of data;

a second register having least significant bits for specifying an offset into said first register and having most significant bits for specifying a memory address of the contents of the first register;

a third register having least significant bits for specifying an offset into said first register and having most significant bits for holding a copy of the contents of the most significant bits of the second register;

byte comparing logic for concurrently comparing multiple bytes with a specific character, said logic having one or more OR-GATES coupled to the characters of said first register said OR-GATES arranged such that a character is coupled to a single OR-GATE and an OR-GATE is coupled to a single character; and a combinatorial logic unit having inputs coupled to the output of the byte comparing logic and to the least significant bits of the second register, the combinatorial logic unit producing an offset signal output which indicates an offset into said first register and which is passed to the least significant bits of said third register and a found signal output which indicates whether the specific character was found, said offset signal output being set to an offset specifying the location of the specific character within said first register if the specific character was found and being set to zero if the specific character was not found.

13. An apparatus as defined in claim 12, said apparatus further comprising:

an addition unit having a first input coupled to the other bits of the second register and a second input coupled to an inverse of the found signal output and having an output coupled to the other bits of said third register.

14. A method for detecting an occurrence of a specific character in a variable-length character string, said method comprising:

storing in a first register one or more characters;

storing in a first portion of a second register an address of the first character stored in the first register;

storing in a second portion of the second register an offset from the address stored in the first portion, said offset indicating a byte location within the first register at which to begin searching for the specific character; and during execution of a single instruction:

concurrently searching the characters within the first register which are located at or subsequent to the byte location specified in the second portion of the second register;

if the specific character is found, then saving in a third register an address indicating a location of the specific character within the first register; and if the specific character is not found, then storing in the third register an address for referencing a character in the variable-length character string following the examined portion of the character string.

15. An apparatus for finding a specific character, said apparatus for use during execution of a single instruction by a processor, said apparatus capable of being used repeatedly to find a specific character in a variable-length character string on a computer, said apparatus comprising:

a first register capable of saving one or more characters of data;

a second register having least significant bits for specifying an offset into said first register and having most significant bits for specifying a memory address of the contents of the first register;

a third register having least significant bits for specifying an offset into said first register and having most significant bits for holding a copy of the contents of the most significant bits of the second register;

byte comparing logic for concurrently comparing multiple bytes with a specific character, said logic having an output and one or more components arranged so that each component has as input the bits from within a character in the first register and each character in the first register provides input to a single component; and a combinatorial logic unit having inputs coupled to the output of the byte comparing logic and to the least significant bits of the second register, the combinatorial logic unit producing an offset signal output which indicates an offset into said first register and which is passed to the least significant bits of said third register and a found signal output which indicates whether the specific character was found, said offset signal output being set to an offset specifying the location of the specific character within said first register if the specific character was found and being set to zero if the specific character was not found.

16. A method for finding a specific character in a variable-length character string stored in a memory accessible to a processor, said method comprising the steps of:

storing a portion of the character string in a first register;

specifying a starting location referring to a location within the first register;

receiving at the processor an instruction; and in response to said instruction executing the following steps within a single instruction:

concurrently comparing to the specific character the characters which are stored in the first register at a location equal to or subsequent to the starting location if the specific character was found, then setting least significant bits in a third register to correspond to a location of the specific character in the first register;

if the specific character was not found, then setting least significant bits in the third register to correspond to a beginning address of the first register; and indicating whether the specific character was found.

17. A method as defined in claim 16, said method further comprising the step of:

before examining characters in a first register for the specific character, performing an exclusive-OR operation between contents of a first register and a reference value having a replicated series of the specific character.

18. An apparatus for finding a specific character, said apparatus for use during execution of a single instruction by a processor, said apparatus capable of being used repeatedly to find a specific character in a character string on a computer, said apparatus comprising:

a first register capable of saving one or more bytes of data;

a second register having least significant bits for specifying a starting offset into said first register and having most significant bits for specifying a memory address associated with data in the first register at the starting offset location;

a third register having least significant bits for specifying an offset into said first register and having most significant bits for holding a copy of the contents of the most significant bits of the second register;

a fourth register having least significant bits for specifying an ending offset into said first register and having other bits for specifying a memory address associated with data in the first register at the ending offset location;

byte comparing logic for concurrently comparing multiple bytes with a zero-valued termination character, said logic having one or more OR-GATES coupled to the bytes of said first register, the OR-GATES arranged so that each byte in said first register is coupled to a single OR-GATE and each OR-GATE is coupled to a single byte;

an address comparison unit having a first input coupled to the other bits of said fourth register and a second input coupled to the other bits of said second register, said comparison logic unit capable of determining whether the first and second inputs specify the same memory address location and producing an output indicating a result of the determination; and a combinatorial logic unit having inputs coupled to the outputs of the byte comparing logic, the least significant bits of the second register, the least significant bits of said fourth register and the output of the comparison logic unit, the combinatorial logic unit producing an offset signal output which indicates an offset into said first register and which is passed to the least significant bits of said third register, a found signal output which indicates whether the specific character was found, said offset signal output being set to an offset specifying the location of the specific character within said first register if the specific character was found and being set to zero if the specific character was not found, a last signal output which indicates whether the ending offset specified by the least significant bits of the fourth register was examined, and an error signal output which indicates whether an error occurred.

19. An apparatus as defined in claim 18 wherein said found signal output and said last signal output are combined into a done signal output using a logical OR operation.

20. A method for finding a specific character in a variable-length character string stored in a memory accessible to a processor, said method comprising the steps of:

storing a portion of the character string in a first register;

specifying a starting location referring to a location within the first register;

specifying an ending location referring to a location within the first register, the starting and ending locations delineating which characters stored in the first register are compared to the specific character;

receiving at the processor an instruction; and in response to said instruction executing the following steps within a single instruction:

concurrently comparing the characters stored in the first register at locations between the starting and ending locations, inclusive, to the specific character;

if the specific character is found, then saving in a register an address indicating a location of the specific character; and         if the specific character is not found, then saving in a register an address for referencing a character in the character string immediately following the examined portion of the character string.

21. A method as defined in claim 4 wherein the specific character is a pre-defined fixed value.

* * * * *